(12) United States Patent
Arora et al.

(10) Patent No.: US 11,533,889 B1
(45) Date of Patent: Dec. 27, 2022

(54) PET CONTAINER FOR DRYING A PET

(71) Applicant: SPAW HOME, LLC, Houston, TX (US)

(72) Inventors: Kyle Arora, Houston, TX (US); Tzu Yao Yen, Missouri City, TX (US); Theodore Bobrick Root, Charlotte, NC (US); Richard Kodama Woodard, Charlotte, NC (US); Stephen Clay Trotter, Cary, NC (US); Raeshon Lamont McNeil, Charlotte, NC (US); Jeremy Losaw, Charlotte, NC (US)

(73) Assignee: SPAW HOME, LLC, Houston, TX (US)

( * ) Notice: Subject to any disclaimer, the term of this patent is extended or adjusted under 35 U.S.C. 154(b) by 32 days.

(21) Appl. No.: 16/727,689

(22) Filed: Dec. 26, 2019

Related U.S. Application Data

(60) Provisional application No. 62/785,631, filed on Dec. 27, 2018.

(51) Int. Cl.
  *A01K 13/00* (2006.01)
  *A01K 1/015* (2006.01)
  *A01K 1/00* (2006.01)

(52) U.S. Cl.
  CPC .......... *A01K 13/001* (2013.01); *A01K 1/0052* (2013.01); *A01K 1/0076* (2013.01); *A01K 1/0157* (2013.01)

(58) Field of Classification Search
  CPC .. A01K 13/001; A01K 1/0052; A01K 1/0076; A01K 1/0157
  USPC .......................................................... 119/498
  See application file for complete search history.

(56) References Cited

U.S. PATENT DOCUMENTS

| | | | | |
|---|---|---|---|---|
| 4,559,903 A | * | 12/1985 | Bloom ................. | A01K 13/001 119/416 |
| 5,435,269 A | * | 7/1995 | Chen .................... | A01K 13/001 119/668 |
| 5,452,681 A | * | 9/1995 | Ho ........................ | A01K 31/08 119/461 |

(Continued)

FOREIGN PATENT DOCUMENTS

| | | | | |
|---|---|---|---|---|
| KR | 200438376 Y1 | * | 2/2008 | .......... A01K 13/001 |
| KR | 101557129 B1 | * | 10/2015 | .......... A01K 13/001 |
| KR | 101963814 B1 | * | 4/2019 | .......... A01K 13/001 |

*Primary Examiner* — Brady W Frazier
(74) *Attorney, Agent, or Firm* — Tillman Wright, PLLC; Chad D. Tillman

(57) ABSTRACT

A pet container includes: a housing comprising a fan for creating an airflow; electronics for operating the fan; and a door configured to transition between a closed position and an open position for ingress and egress of a pet. The pet container defines a pet containment space, and the pet container comprises ducts through which the airflow created by the fan flows into the pet containment space for blowing air onto a pet. The fan preferably is an impeller and the at least one of the duct preferably is defined at least an interior passageway that is formed in the housing. The pet container further preferably includes a heater for heating the airflow; an aromatherapy diffuser; a light, laser, or array of LEDs for emitting infrared or near infrared light into the containment space with a wavelength of between about 620 and about 1000 nanometers for providing photobiomodulation.

16 Claims, 5 Drawing Sheets

(56) References Cited

U.S. PATENT DOCUMENTS

| | | | | |
|---|---|---|---|---|
| 6,058,886 | A * | 5/2000 | Haines | A01K 13/001 |
| | | | | 119/601 |
| 6,826,850 | B2 * | 12/2004 | Jewell | F26B 9/003 |
| | | | | 34/202 |
| 6,923,144 | B2 * | 8/2005 | Little | A01K 1/0218 |
| | | | | 119/448 |
| 7,681,532 | B1 * | 3/2010 | Deane | A01K 1/0245 |
| | | | | 119/473 |
| 9,451,758 | B2 * | 9/2016 | Kaneda | A01K 13/001 |
| 9,675,047 | B2 * | 6/2017 | Carter | A01K 13/001 |
| 9,737,045 | B1 * | 8/2017 | Scanlan | A01K 1/0107 |
| 10,039,264 | B2 * | 8/2018 | Kaneda | A01K 13/001 |
| 10,426,139 | B1 * | 10/2019 | Hill | A01K 13/001 |
| 10,932,435 | B2 * | 3/2021 | Jung | B64D 11/00 |
| 10,932,436 | B2 * | 3/2021 | Marshall, III | F24F 13/085 |
| 2002/0023594 | A1 * | 2/2002 | Greene, Jr. | A01K 1/0236 |
| | | | | 119/496 |
| 2009/0050069 | A1 * | 2/2009 | Hurwitz | A01K 1/0245 |
| | | | | 119/497 |
| 2016/0135428 | A1 * | 5/2016 | Nicholson | A01K 13/003 |
| | | | | 119/604 |
| 2019/0110437 | A1 * | 4/2019 | Watchorn | A01K 13/002 |
| 2019/0261594 | A1 * | 8/2019 | Taylor | A01K 1/0157 |
| 2020/0029530 | A1 * | 1/2020 | Yoon | A01K 13/001 |
| 2020/0060225 | A1 * | 2/2020 | Roberson | G03B 15/02 |
| 2021/0000075 | A1 * | 1/2021 | Im | A47K 10/48 |

* cited by examiner

PET CONTAINER FOR DRYING A PET

The present application is a nonprovisional application of, and claims priority under 35 U.S.C. § 119(e) to, U.S. provisional patent application 62/785,631, filed Dec. 27, 2018, the disclosure of which is incorporated herein by reference.

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

COMPUTER PROGRAM LISTING

Submitted concurrently herewith via the USPTO's electronic filing system, and incorporated herein by reference, are computer program files including instructions, routines, and/or other contents of several computer programs. A table setting forth the name and size of files included in the computer program listing is included below.

| File Name | Creation Date | File Size (bytes) |
| --- | --- | --- |
| ascify.txt | Dec. 26, 2019 17:32 | 37,473 |
| readme.txt | Dec. 26, 2019 17:32 | 2,753 |
| package.txt | Dec. 26, 2019 17:32 | 1,349,241 |
| package2.txt | Dec. 26, 2019 17:32 | 1,961,464 |

One of these files, "readme.txt", contains instructions for extracting information from "package.txt" and "package2.txt". "Package.txt" and "package2.txt" each represents a compressed binary file that has been converted to ascii format. Each of these files can be converted back into a compressed .zip archive utilizing an assembly conversion program source code, which is contained in "ascify.txt". The readme file includes instructions for compiling and running this conversion program, and instructions for converting the other text files each to a compressed, binary file. Each compressed, binary file is a .zip archive that includes an eDrawings file for a computer model illustrating aspects and features in accordance with one or more preferred embodiments of the invention. The eDrawings file can be opened using eDrawings software available from Dassault Systèmes SolidWorks Corporation, a Delaware corporation having a principal place of business in Waltham, Mass. FIGS. 32-34a of the Appendix represents screenshots taken from one of the eDrawings file of the computer program listing.

BACKGROUND OF THE INVENTION

The invention generally relates to containers for pets and, in particular, containers for pets that facilitate the drying thereof, especially after bathing.

It is believed that a need exists for improved convenience in the drying of a pet, especially after bathing or after a walk during which a pet becomes wet. Conventional methodologies include toweling of a pet or brushing with a blow dryer, all while restraining the pet. It is also known to confine a pet within a crate for restraining the pet until the pet is dry. To facilitate drying, a fan can be placed adjacent the crate for blowing air through the crate, or a blow dryer can be manually held directing hot air onto the pet. None of the methodologies are believed to provide great convenience. An embodiment of the invention in accordance with at least one or more aspects and features is believed to represent an improvement thereover that provides much greater convenience.

SUMMARY OF THE INVENTION

The invention includes many aspects and features. Moreover, while many aspects and features relate to, and are described in, the context of containers for pets and, in particular, dogs, the invention is not limited to use only in such context, as will become apparent from the following summaries and detailed descriptions of aspects, features, and one or more embodiments of the invention. Indeed, the invention finds use in other contexts, including the drying of animals that may not be pets, and the drying by animal groomers and other professional users.

Accordingly, in an aspect of the invention, a container for a pet comprises: a housing comprising a fan for creating an airflow; electronics for operating the fan; and a door configured to transition between a closed position and an open position for ingress and egress of a pet; wherein the pet container defines a pet containment space; and wherein the pet container comprises at least one duct through which the airflow created by the fan flows into the pet containment space for blowing air onto a pet.

In a feature, the pet container comprises a crate.

In a feature, the housing further comprises a heater for heating the airflow.

In a feature, the fan comprises an impeller.

In a feature, a duct is defined at least in part by an interior passageway that is formed in the housing.

In a feature, the pet container further comprises a heater for heating the airflow.

In a feature, the pet container further comprises an aromatherapy diffuser. The aromatherapy diffuser preferably delivers plant materials, aromatic plant oils, essential oils, other aroma compounds, and combinations thereof as a fine vapor or particulate to the airflow, whereby a pet within the pet containment space will absorb the fine vapor or particulate within the airflow into the body through the respiratory system, and whereby the fur or hair of the pet will receive the fine vapor or particulate within the airflow for imparting a desirable scent or fragrance to the pet.

In a feature, the pet container further comprises a light, laser, or array of LEDs for emitting infrared or near infrared light into the containment space with a wavelength of between about 620 and about 1000 nanometers for providing photobiomodulation.

In another aspect of the invention, a combination of components contained in a package or box for assembling a pet container comprises: a housing comprising preassembled therein an impeller for creating an airflow; electronics for operating the impeller; a door configured to transition between a closed position and an open position for ingress and egress of a pet; a base; and one or more panels; wherein the pet container when assembled defines a pet containment space, and wherein the assembled pet container defines passageways through which the airflow created by the impeller flows into the pet containment space for blowing air onto a pet.

In a feature, the housing further comprises a heater for heating the airflow.

In another feature, the housing comprises an aromatherapy diffuser. In this respect, plant materials, aromatic plant oils, essential oils, other aroma compounds, and combinations thereof are delivered as a fine vapor or particulate dispersed within the airflow to a pet in the pet containment space, whereby a pet within the containment space will absorb the fine vapor or particulate into the body through the respiratory system and the fur or hair of the pet will receive the fine vapor or particulate for imparting a desirable scent or fragrance to the pet.

In another aspect of the invention, a combination of components contained in a package or box for assembling a pet container comprises: a housing comprising preassembled therein a fan for creating an airflow; electronics for operating the fan; and a door configured to transition between a closed position and an open position for ingress and egress of a pet; wherein the pet container defines a pet containment space; and wherein the pet container comprises at least one duct through which the airflow created by the fan flows into the pet containment space for blowing air onto a pet.

In a feature, the fan comprises an impeller.

In a feature, a duct is defined at least in part by an interior passageway that is formed in the housing.

In a feature, the housing further comprises, preassembled therein, a heater for heating the airflow.

In a feature, the housing further comprises, preassembled therein, a heater for heating the airflow.

In a feature, the housing further comprises, preassembled therein, an aromatherapy diffuser. The aromatherapy diffuser preferably delivers plant materials, aromatic plant oils, essential oils, other aroma compounds, and combinations thereof as a fine vapor or particulate to the airflow, whereby a pet within the pet containment space will absorb the fine vapor or particulate within the airflow into the body through the respiratory system, and whereby the fur or hair of the pet will receive the fine vapor or particulate within the airflow for imparting a desirable scent or fragrance to the pet.

In a feature, the housing further comprises, preassembled therein, a light, laser, or array of LEDs for emitting infrared or near infrared light into the containment space with a wavelength of between about 620 and about 1000 nanometers for providing photobiomodulation.

In another aspect of the invention, a combination of components contained in a package or box for assembling a pet container comprises: a housing comprising preassembled therein an impeller for creating an airflow; electronics for operating the impeller; a door frame; a door configured for attachment to the door frame and to transition, when attached to the door frame, between a closed position and an open position for ingress and egress of a pet; a base configured to extend between and interconnect the housing and the door frame; and one or more panels configured to extend between and interconnect the housing and the door frame; wherein the pet container when assembled defines a pet containment space.

In a feature, when the pet container is assembled, the housing, base, and door frame define passageways through which an airflow created by the impeller flows into the pet containment space for blowing air onto a pet.

In a feature, the housing further comprises a heater for heating the airflow.

In another feature, the housing comprises an aromatherapy diffuser. In this respect, plant materials, aromatic plant oils, essential oils, other aroma compounds, and combinations thereof are delivered within the airflow to a pet in the pet containment space.

In another aspect of the invention, a combination of components contained in a package or box for assembling a pet container comprises: a housing comprising preassembled therein an impeller for creating an airflow; electronics for operating the impeller; a door configured for attachment to the housing and to transition, when attached to the housing, between a closed position and an open position for ingress and egress of a pet; and one or more panels configured to extend between and interconnect opposite ends of the housing; wherein the pet container when assembled defines a pet containment space.

In a feature, the housing defines passageways through which an airflow created by the impeller flows into the pet containment space for blowing air onto a pet.

In a feature, the housing further comprises a heater for heating the airflow.

In another feature, the housing comprises an aromatherapy diffuser. In this respect, plant materials, aromatic plant oils, essential oils, other aroma compounds, and combinations thereof are delivered within the airflow to a pet in the pet containment space.

In another aspect of the invention, a combination of components contained in a package or box for assembling a pet container comprises: a housing comprising preassembled therein an impeller for creating an airflow and one or more air passageways through which the airflow passes; electronics for operating the impeller and the heater; a door frame, the door frame comprising one or more air passageways; a door configured for attachment to the door frame and to transition, when attached to the door frame, between a closed position and an open position for ingress and egress of a pet; a base configured to extend between and interconnect the housing and the door frame, the base comprising one or more air passageways extending from one end of the base to another end of the base and configured to convey airflow from the housing to the door frame; and one or more panels configured to extend between and interconnect the housing and the door frame; wherein the pet container when assembled defines a pet containment space; and wherein the one or more air passageways of the housing, the door frame, and the base define ducts through which the airflow passes, the ducts leading from one or more air intakes to the impeller and from the impeller to one or more vents for directing the airflow into the pet containment space.

In another an aspect of the invention, a combination of components contained in a package or box for assembling a pet container comprises: a housing comprising preassembled therein an impeller for creating an airflow from one or more air intakes of the housing to one or more vents of the housing, and a heater for heating the airflow; electronics for operating the impeller and the heater; a door frame comprising one or more air passageways; a door configured for attachment to the door frame and to transition, when attached to the door frame, between a closed position and an open position for ingress and egress of a pet; a base configured to extend between and interconnect the housing and the door frame, the base comprising one or more air passageways extending from one end of the base to another end of the base and configured to convey airflow from one or more of the air passageways of the housing to one or more of the passageways of the door frame; and one or more panels configured to extend between and interconnect the housing and the door frame; wherein the pet container when assembled defines a pet containment space.

In a feature of this aspect, the electronics comprise a control panel for user control.

In a feature, the electronics include a timer for operating the fan and heater for a predetermined period of time, after which the fan and heater cease operations. Preferably, such predetermined period of time is set by a user.

In another feature, the electronics comprise a wireless networking interface for wireless control by a user.

In a feature, the combination further comprises one or more temperature sensors for measuring air temperature, wherein the electronics control the heater based on measured temperature and a temperature setting by a user.

In a feature, the package or box comprises product packaging for retail sale to a consumer for assembly of the pet container by the consumer.

In a feature, the package or box comprises packaging for shipping to a consumer for assembly of the pet container by the consumer.

In a feature, the electronics comprise a power supply for powering the impeller and the heater, and the power supply preferably comprises a cord having an end configured to be plugged into an electric outlet of a home. Alternatively, or additionally, the power supply may comprise one or more rechargeable batteries.

In a feature, the base comprises lengthwise support members within which the one or more air passageways are defined.

In a feature, the base comprises a floor extending between the housing and the door frame.

In another feature, the combination further comprises a bed extending between the housing and the door frame. The bed preferably comprises a non-foldable mat. The mat in turn preferably comprises an outer water-resistant or waterproof covering which covering encloses a foam core that provides cushioning. In alternatives, the bed is foldable.

In feature, the base comprises lengthwise support members within which the one or more air passageways are defined, and the combination further comprises a bed that is configured to be inserted and withdrawn from the base through a gap created between one of the lengthwise support members and one of the panels.

In features, the base comprises lengthwise support members within which the one or more air passageways are defined, and the combination further comprises a tray that preferably is supported by the lengthwise support members.

In a feature, the combination further comprises a tray that preferably is supported by the lengthwise support members and that preferably is configured to slide under a bottom of the door when inserting and withdrawing the tray.

In a feature, the base comprises a tray assembly extending under a bed. The tray assembly preferably comprises an impervious tray and a porous support structure or grate located within the tray for supporting the bed. The tray assembly and door preferably are configured so that the tray assembly is able to be slid under a bottom of the door when inserting and withdrawing the tray assembly.

In a feature, the door frame comprises one or more of the vents for directing the airflow into the pet containment space. The vents preferably extend in a heightwise direction on opposite vertical sections of the door frame.

In features, the base comprises lengthwise support members within which the one or more air passageways are defined, and each lengthwise support member comprises a vent for directing the airflow into the pet containment space, each vent preferably extending in a lengthwise direction.

In a feature, the housing directs the airflow into the pet containment space from each of the four corners of the pet container.

In a feature, the housing directs the airflow into the pet containment space from each of two opposite lengthwise sides of the pet container.

In a feature, the housing directs the airflow into the pet containment space from each of the four corners of the pet container and from each of two opposite lengthwise sides of the pet container.

In a feature, the pet container comprises six vents for directing the airflow into the pet containment space.

In a feature, the housing comprises an air intake through which air is suctioned from the pet containment space for return to the impeller. The air intake preferably is located in a bottom portion of the housing, and the combination preferably comprises a filter located at the air intake port.

In a feature, the base comprises enclosed channel supports each configured for attachment at a first end to the housing and at a second end to the door frame, the channel supports comprising the one or more air passageways for airflow from one or more of the air passageways of the housing to one or more of the air passageways of the door frame.

In features, the combination comprises lengthwise supports each configured for attachment at a first end to the housing and at a second end to the door frame; further comprises a tray assembly for collecting fluid, wherein each lengthwise support is configured to receive and support the tray assembly. In this respect, the tray assembly preferably comprises a water impervious tray having a lip, each lengthwise support being configured to receive thereon the lip of the tray. Additionally, a bed preferably is placed over the tray assembly and extends between the housing and the door frame.

In a feature, the one or more panels consist of two side panels and a top panel.

In another feature, one or more of the panels is transparent.

In features, each of the panels attaches to the housing through a press-fit or snap-fit connection, and attaches to the door frame through a press-fit or snap-fit connection.

In features, the base attaches to the housing through a press-fit or snap-fit connection, and attaches to the door frame through a press-fit or snap-fit connection.

In a feature, the door attaches to the door frame by being received within a recess or track of the door frame. In an embodiment including this feature, a pin of the door is received within a recess or track of the door frame for attaching the door to the door frame.

In a feature, the pet container is configured to be assembled without using fasteners.

In a feature, the combination further comprises a scent cartridge configured for disposition within a path of the airflow for providing an aroma to the airflow.

In features, the base comprises lengthwise support members within which the one or more air passageways are defined, and each of the lengthwise supports is a single piece of molded material or a single piece of extruded material.

In a feature, each of the one or more panels comprises a single rectangular sheet of transparent plastic.

In another feature, the container is in the form of a crate.

In an aspect, a pet container comprise: a housing comprising an impeller for creating an airflow from one or more air intakes of the housing to one or more vents of the housing, and a heater for heating the airflow; electronics for operating the impeller and the heater; a door frame; a door attached to the door frame and transitionable between a closed position and an open position for ingress and egress of a pet; a base extending between and interconnecting the housing and the door frame; and one or more panels extending between and interconnecting the housing and the door frame; wherein the pet container defines a pet containment space.

In another aspect, a method of assembling components into a pet container. The components comprise a housing comprising preassembled therein an impeller for creating an airflow from one or more air intakes to one or more vents, and a heater for heating the airflow; electronics for operating the impeller and the heater; a door frame; a door configured for attachment to the door frame and to transition, when attached to the door frame, between a closed position and an open position for ingress and egress of a pet; a base configured to extend between and interconnect the housing and the door frame; and one or more panels configured to extend between and interconnect the housing and the door frame. The method comprises the steps of first: attaching the housing to the base, and attaching the door frame to the base. Thereafter, the method comprises the steps of: attaching the one or more panels to the housing and door frame; inserting the door into the door frame; locating the tray assembly within the base; and locating the bed within the base as a floor of the pet container. The method results in an assembled pet container that defines a pet containment space for drying a pet.

In a feature of this aspect, the base comprises enclosed channel supports that extend lengthwise in spaced parallel relation to each other between after attachment to the housing and to the door frame.

In another feature, the step of locating the bed comprises placing the bed on top of and between the enclosed channel supports.

In a feature, the step of locating the bed comprises inserting the bed through a lengthwise gap defined between one of the panels and one of the enclosed channel supports.

In a feature, the step of locating the tray assembly comprises placing the tray assembly on top of and between the enclosed channel supports. Preferably, the bed is placed on top of the tray assembly.

In a feature, the step of locating the tray assembly comprises sliding the tray assembly under the door when the door is attached to the door frame and closed.

In a feature, the pet container is assembled without using fasteners.

In another aspect, a pet container for drying a pet comprises means for containing a pet within a pet containment space; means for creating an airflow within the pet containment space; and means for heating the airflow for drying the pet.

Another aspect comprises a method of drying a pet by placing a pet within a pet containment space and circulating a heated airflow through the pet containment space.

In a feature of this aspect, the heated airflow that is circulated through the pet containment space comprises a scented airflow.

In yet another aspect, a pet container comprises (a) a housing comprising a fan for creating an airflow and one or more air passageways through which the airflow passes from one or more air intakes of the housing to the fan, and from the fan toward one or more vents; (b) electronics for operating the fan; (c) a door frame comprising one or more air passageways; (d) a door attached to the door frame and transitionable between a closed position and an open position for ingress and egress of a pet; (e) one or more enclosed channel supports extending lengthwise between and interconnecting the housing and the door frame, the one or more enclosed channel supports comprising one or more air passageways extending from the housing to the door frame for airflow from the housing to the door frame; and one or more panels extending between and interconnecting the housing and the door frame.

In a feature, the door frame comprises one or more of the vents.

In a feature, the base comprises one or more of the vents.

In a feature, the housing comprises one or more of the vents.

In a feature, the housing, the door, and the one or more panels collectively define a pet containment space.

The eDrawings files of the computer program listing, incorporated above, disclose further aspects and features of the invention.

The Appendix attached hereto and hereby incorporated herein by reference further discloses aspects and features of the invention found, for example, in other embodiments of pet containers for drying a pet.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

DETAILED DESCRIPTION

Figure 1:
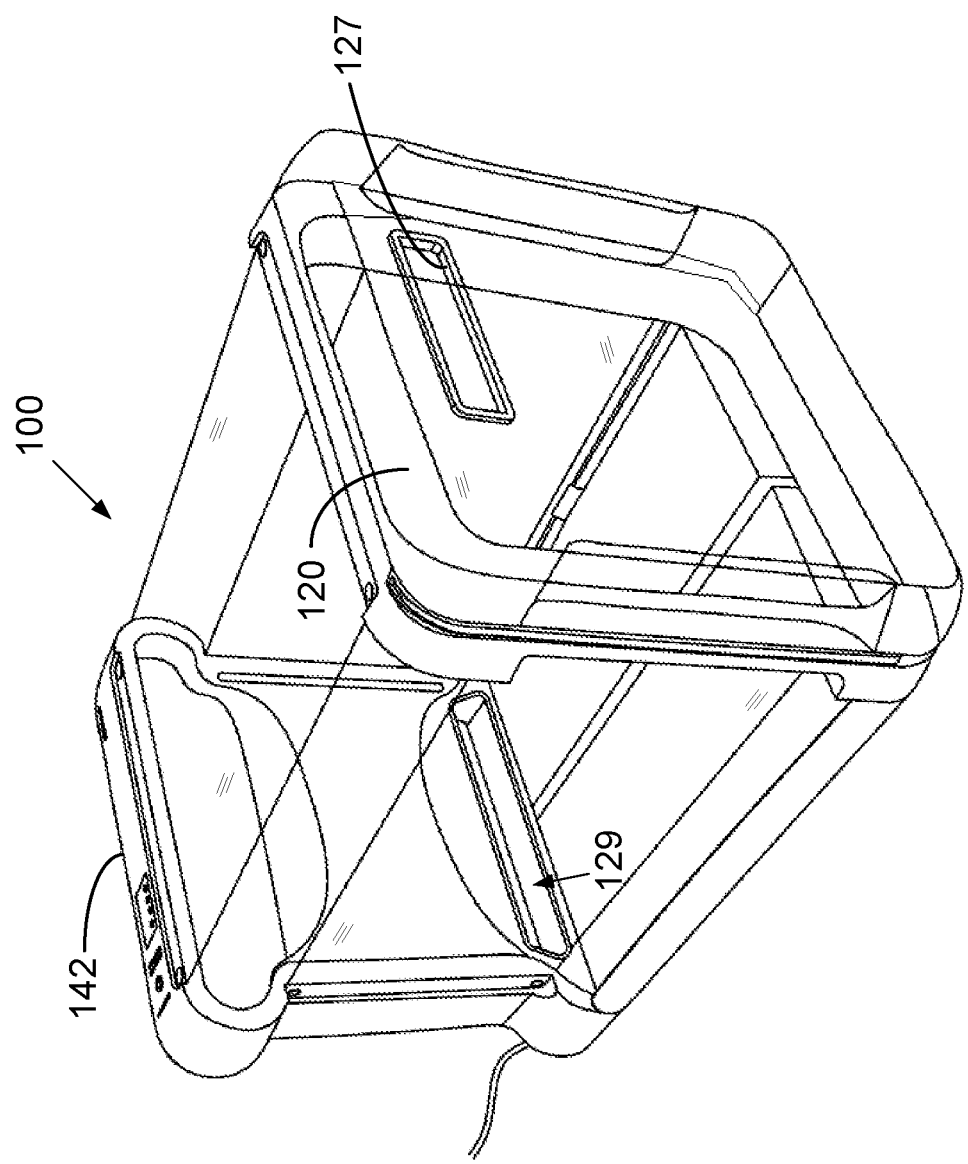
FIG. 1 is a perspective view of a pet container 100 for drying a pet in accordance with one or more aspects and features of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

FIG. 1 is a perspective view of a preferred pet container 100 for drying a pet in accordance with one or more aspects and features of the invention. FIG. 1 discloses a preferred air intake 129 located on an interior of the pet container 100; a control panel 142; and a door 120 of the pet container 100 that includes an opening defining a handle 127, with a rubber molding extending around the edge of the opening.

Figure 3:
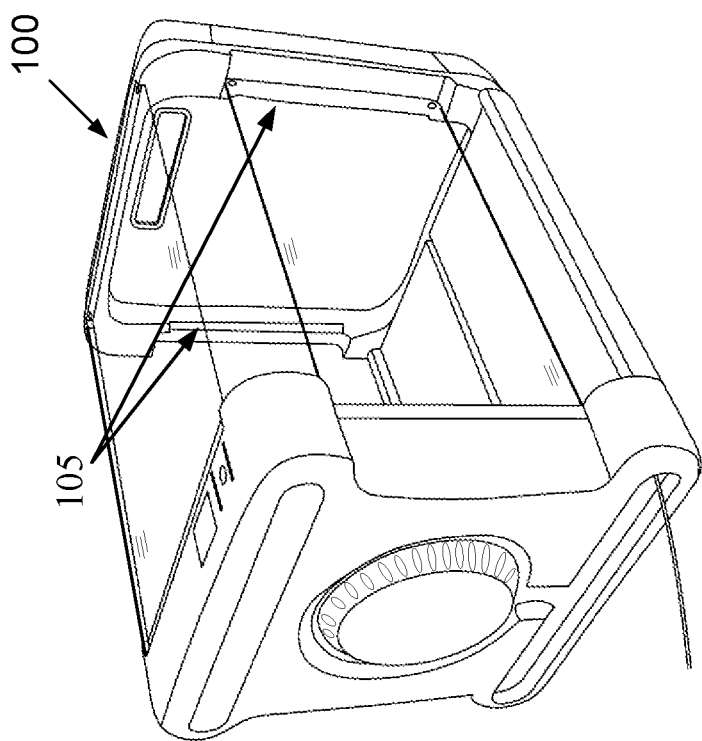
FIG. 3 is another perspective view of the pet container 100.
Figure 2:
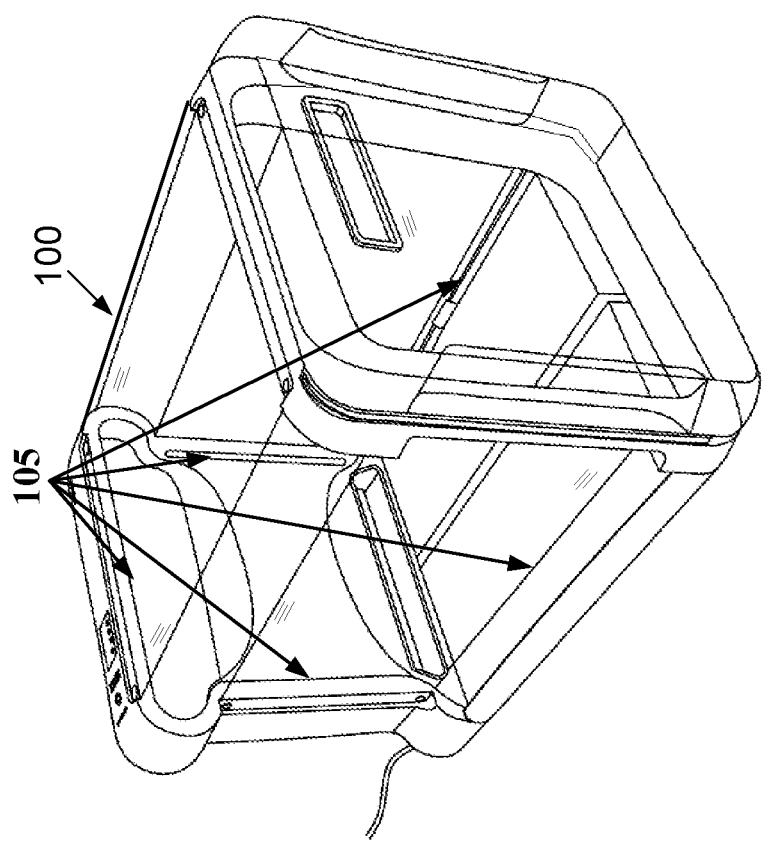
FIG. 2 is another perspective view of the pet container 100.

FIGS. 2 and 3 are additional perspective views of the pet container 100 that serve to illustrate six preferred vents 105 for directing a heated airflow into the containment space of the pet container 100 from each of the corners and from each of the lengthwise sides of the container 100.

Figure 4:
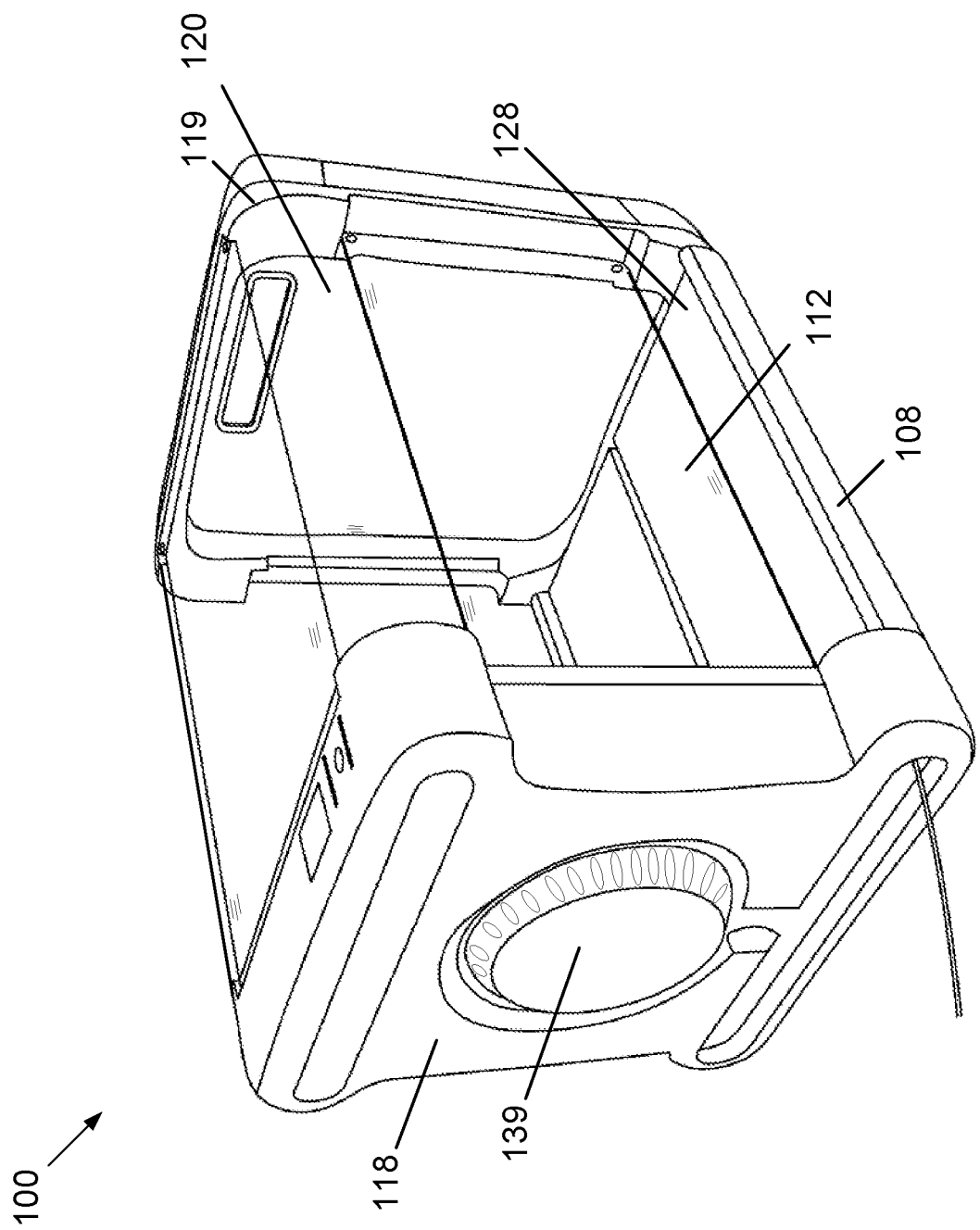
FIG. 4 is another perspective view of the pet container 100.

FIG. 4 is another perspective view of the pet container 100, wherein an alternative or additional air intake 139 is shown that is located on an exterior of the housing 118. Preferably, the housing 118 and door frame 119 are molded, and each of the lengthwise supports 108,110 consists of a single molded or extruded piece. Each of the panels preferably comprises a rectangular piece of plastic that is clear or transparent.

Figure 5:
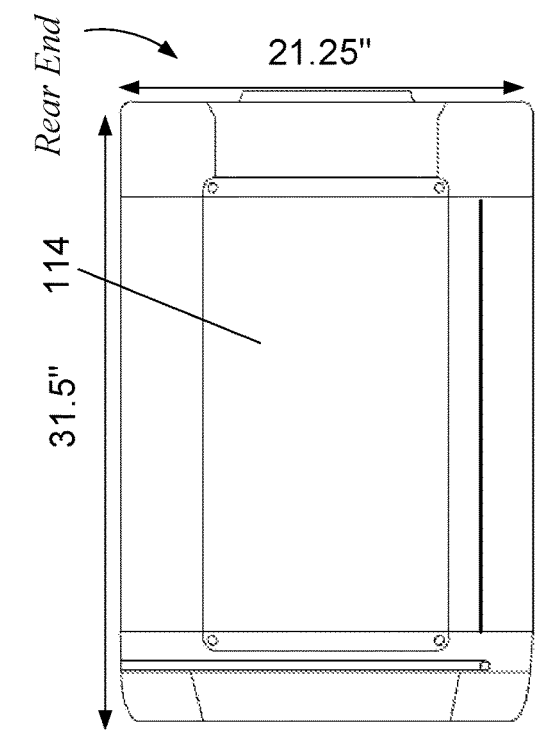
FIG. 5 is a perspective view of a first end of the pet container 100, which end includes a door 120 for ingress and egress of a pet.
Figure 6:
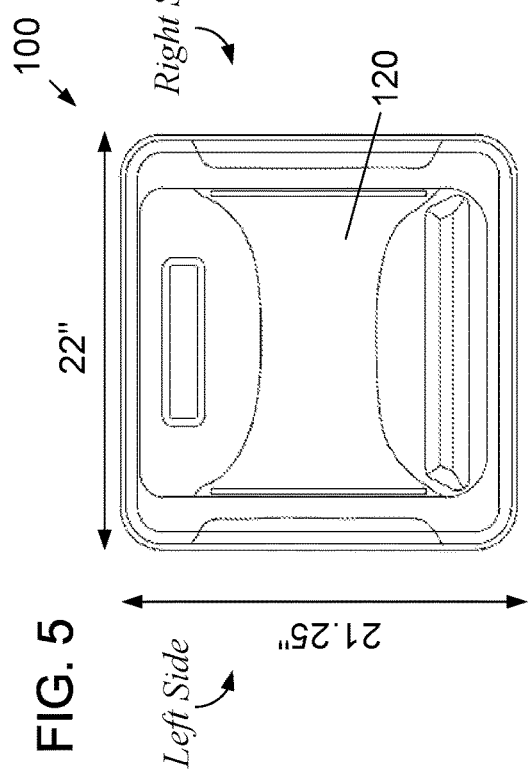
FIG. 6 is a perspective view of a first side of the pet container 100.
Figure 7:
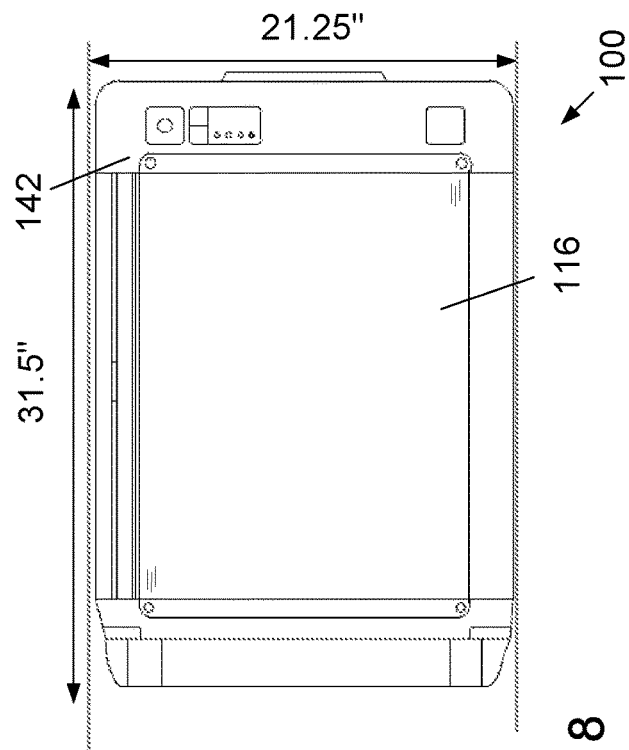
FIG. 7 is a perspective view of a second, opposite end of the pet container 100.
Figure 8:
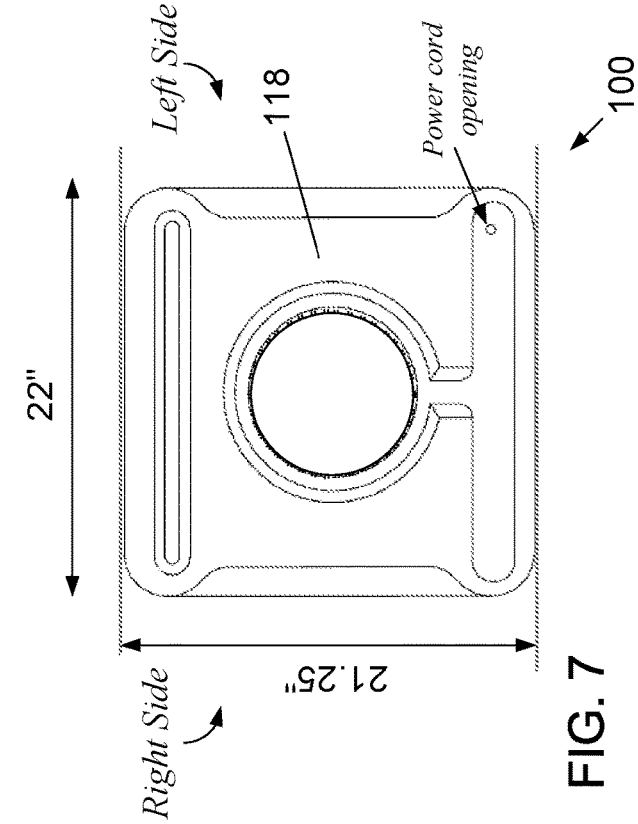
FIG. 8 is a perspective view of a top of the pet container 100.

FIG. 5 is a perspective view of a front end of the pet container 100, which end includes a door 120 for ingress and egress of a pet. Preferred operation of the door 120 is disclosed below with reference to FIGS. 13-15 of the Appendix. As seen in FIG. 5, for example, the pet container 100 has a preferred width of twenty-two inches and preferred height of twenty-one and one quarter inches. As seen in FIG. 6, for example, the pet container 100 has a preferred length of thirty-one and one-half inches. FIG. 7 is a perspective view of the opposite, rear end of the pet container 100; and FIG. 8 is a perspective view of a top of the pet container 100 showing top panel 116.

Figure 9:
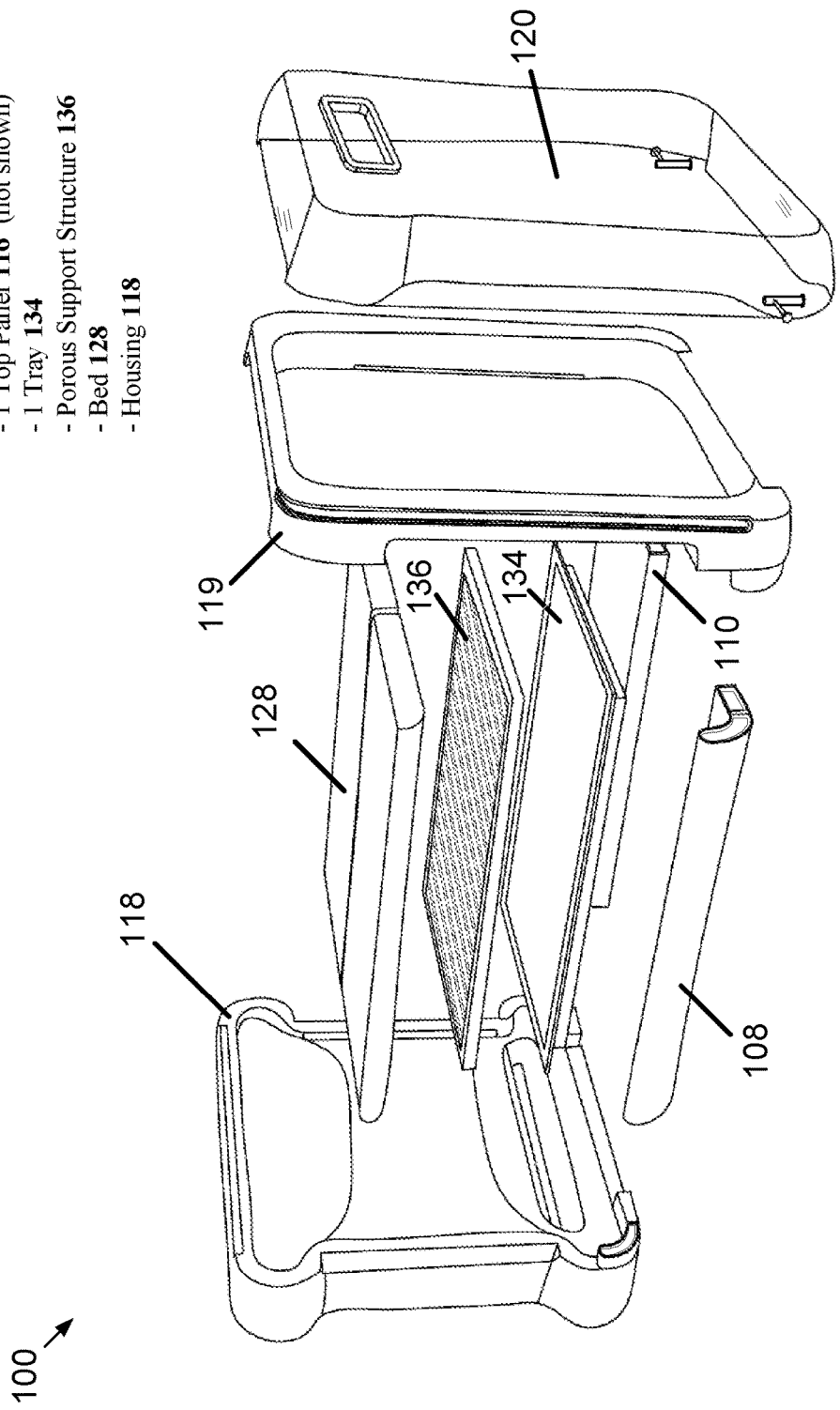
FIG. 9 is a partially exploded perspective view of the pet container 100.

FIG. 9 is a partially exploded perspective view of the pet container 100 that illustrates discrete components of the pet container assembly when sold or shipped to a consumer. The illustrated components include the two lengthwise supports 108,110; housing 118; door frame 119; door 120; bed or bed 128; tray 134; and porous support structure 136. Missing from view in FIG. 9, but also included as components in such assembly, are side panels 112,114 and top panel 116. Preferable, there are eleven components of the assembly. Furthermore, these components are configured to be assembled into the pet container without use of any fastener, such as a bolt or screw. The components preferably attached together by snap-fitting or snap-fitting into one another, or are received on top of or within one another.

In use, a pet is placed into the containment space and a heated airflow is directed onto the pet for drying of the pet. Additional drawings are set forth in the Appendix, which is incorporated herein by reference, and such use is illustrated in each of FIGS. 10 and 11 of the Appendix. Specifically, FIG. 10 of the Appendix is a perspective view of the pet container 100 with a pet located on the interior of the pet container 100; and FIG. 11 of the Appendix is another perspective view of the pet container 100 with a pet located on the interior of the pet container 100, wherein the pet is seen being subjected to an airflow—preferably heated—for drying of the pet.

FIG. 12 of the Appendix is a partially exploded perspective view of the pet container 100, wherein left side panel 112, right side panel 114, and top panel 116 are seen detached from impeller housing 118 and door frame 119 of the pet container 100. As shown therein, each panel is attached to the housing 118 and to the frame 119 by pressing the panel onto a respective resilient protuberance in the form of a rubber gasket 113 such that the rubber gasket 113 tightly fits within and protrudes through a respective opening in the panel.

Operation of the door 120 is illustrated in FIGS. 13-15 of the Appendix. In this regard, FIG. 13 of the Appendix is a perspective view of the pet container 100 showing upward translational movement of the door 120, e.g., sliding of the door 120 within a track 122 formed in the door frame 119; and FIG. 14 of the Appendix is a perspective view of the pet container 100 showing the following pivoting movement of the door 120 as it is positioned onto the top of the pet container 100 resulting in the pet container 100 being open for ingress or egress of a pet. Furthermore, FIG. 15 of the Appendix is a closeup view of part of the pet container 100 showing the track 122 within which a pin 124 of the door 120 slides and translates, whereby the door 120 is able to undergo the upward translational and pivoting movements that are seen in FIGS. 13 and 14 of the Appendix. The top of the door 120 preferably is shaped and configured to receive the top panel 116 for secure positioning of the door 120 when the door 120 is positioned on top of the top panel 116, as illustrated in FIG. 15 of the Appendix.

FIG. 16 of the Appendix is a perspective view of the pet container 100 showing removal of bed 128. The bed 128 is removed and inserted in the container 100 by sliding through the gap defined between side support 108 and side panel 112, or the gap defined between side support 110 and side panel 114.

FIG. 17 of the Appendix is a perspective view of the bed 128, including phantom views thereof, which collectively illustrate a folding in half and fastening of the bed 128 following its removal from the pet container 100. The bed 128 preferably is in the form of a mat having a foam core. The exterior of the mat preferably is water resistant or waterproof.

FIG. 18 of the Appendix is a perspective view of the pet container 100 showing withdrawal of the tray assembly 132, which comprises tray 134 and porous support structure 136.

FIG. 19 of the Appendix is a perspective exploded view of the tray assembly 132 showing the tray 134 and a porous support structure 136 or grate that is contained within the tray 134. The porous support structure 136 supports the bed 128 from sagging into the tray 134 while enabling the collection of fluid within the tray 134.

FIG. 20 of the Appendix is a top plan view of a portion of the pet container 100 including a control panel 142 and controls thereof, by which a user operates the drying capabilities of the pet container 100. The drying capabilities comprise creation and direction of an airflow into the containment space of the pet container and, preferably, the circulation of air through the containment space. Furthermore, the drying capabilities additional preferably include the heating of the airflow using one or more heaters.

FIG. 21 of the Appendix illustrates operation of the power control 144 of the control panel 142. The power control 144 of the control panel 142 is held down for four seconds in order to power on or off the pet container 100. The power control 144 is pressed once without being held down to start a drying cycle.

FIG. 22 of the Appendix illustrates operation of the aroma control 146 of the control panel 142. The control 146 is pressed to open a lid and gain access to a chamber that is in fluid communication with the airflow through the housing following the impeller. With the lid open, a cartridge or pod can be removed (if empty) and inserted (if not empty) into the chamber. The cartridge or pod preferably contains plant materials, aromatic plant oils, essential oils, other aroma compounds, and combinations thereof believed to improve psychological or physical well-being of a pet and is intended for use in providing aromatherapy to a pet. The contents of the cartridge or pod when located in the chamber thereby function as a diffuser that disperses the contents as a fine vapor or particulate within the airflow for transport to the containment space. A pet within the containment space will absorb the fine vapor or particulate into the body through the respiratory system. The fur or hair of the pet further will receive the fine vapor or particulate thereby imparting a desirable scent or fragrance to the pet.

Insertion of a cartridge 162 into the chamber, for example, is illustrated in FIG. 27 of the Appendix. Preferably, a spring-loaded mechanism is included in the housing for receiving the cartridge within the chamber, wherein pressing down on the inserted cartridge 162 locks the cartridge 162 within the chamber in air communication with the airflow, and pressing down again pops the cartridge 162 partially upward out of the chamber for grasping and withdrawal by hand. The aroma or scent provided preferably is pleasing to the pet for calming of the pet, to the user, or both. Indeed, the use of aromatherapy is preferred when drying a pet. FIG. 28 of the Appendix illustrates the interior side of the housing 118 wherein a vent 172 is provided therein for venting of the airflow passing through the chamber directly into the containment space.

Continuing with the discussion of the control panel 142, cycle control 148 illustrated in FIG. 23 of the Appendix illustrates operation of the cycle control 148. This control 148 preferably enables a user to cycle through the settings types for adjusting each setting type using level control 150 of FIG. 24 of the Appendix, the operation of which is illustrated in FIG. 24 of the Appendix. The setting types preferably include temperature of the airflow; enabling heating of the airflow; adjusting the speed of the blower; adjusting the predetermined time of a drying operation; and adjustment of the airflow that is directed through the scent chamber for adjusting the strength of the scent applied to a pet.

FIG. 25 of the Appendix is a perspective view of the pet container 100 showing the interior air intake 129 located on the interior of the pet container 100. It will further be appreciated that the panel 112 has been omitted from the drawing for clarity, and as illustrated an air intake subpanel 130 has been detached from the housing 118 for access to a filter 152. FIG. 26 of the Appendix is a closeup view of the air intake subpanel 130 and groove 131 located along a bottom thereof for removing the subpanel 130.

FIG. 29 of the Appendix is a perspective view of another pet container 200 for drying a pet in accordance with one or more aspects and features of the invention. FIG. 30 of the Appendix is a perspective view of the pet container 200 showing upward translational movement of the door 220. FIG. 31 of the Appendix is a perspective view of the pet container 200 showing pivoting movement of the door 220 as it is positioned onto the top of the pet container 200.

The pet container 200 is similar in structure and operation to pet container 100. A difference is found in the door frame 219 and the door 220, wherein no pin and no track are found. Instead, the door 220 simply slides within a flanged recess defined in the door frame 219, which flanges keep the door 220 from falling forward out of the frame 219. As before, the door 220 must be translated upwardly for ingress or egress of a pet, with the door 220 preferably being laid on the top panel for convenience when facilitating ingress or egress of the pet using both hands of the user.

FIG. 32 of the Appendix is a perspective view of the pet container 200 in the form of a black and white line drawing; and FIG. 32a of the Appendix is a shaded view of FIG. 32 of the Appendix. Similarly, FIG. 33 of the Appendix is an exploded perspective view of the pet container 200 of FIG. 32 of the Appendix; and FIG. 33a of the Appendix is a shaded view of FIG. 33 of the Appendix. FIG. 34 of the Appendix is another exploded perspective view of the pet container 200 of FIG. 32 of the Appendix; and FIG. 34a of the Appendix is a shaded view of FIG. 34 of the Appendix. FIGS. 33-34a of the Appendix serve to show components of the housing that preferably are preassembled within the housing when the container is shipped or sold to a consumer at retail, including the impeller and heater. These figures further reveal that housing 218 comprises two subcomponents 218a,218b that are joined together to form the housing 218; and that door frame 219 comprises two subcomponents 219a,219b that are joined together to form the door frame 219. These subcomponents preferable are joined by welding or an adhesive during preassembly and are not joined by a user after shipping or retail sale when the other components are assembled by the user to form the pet container 200. These components are interconnected by lengthwise support 208; lengthwise support 210; and panels 212,214,216.

A preferred heater 82 is disclosed with reference to FIGS. 35-39 of the Appendix. In particular, FIG. 35 of the Appendix is a perspective view of a preferred PTC (Positive Temperature Coeffient) heater 82 which uses ceramic for the heating of circulated air in each of the pet containers 100,200. The impeller housing 118 preferably includes one or more PTC heaters for the heating of the circulated air, with one being illustrated in FIGS. 33-34a of the Appendix. Additionally, FIG. 36 of the Appendix is a plan view of a side of the heater 82 of FIG. 35 of the Appendix; FIG. 37 of the Appendix is a plan view of a top of the heater 82 of FIG. 35 of the Appendix. FIG. 38 of the Appendix is a plan view of an end of the heater 82 of FIG. 35 of the Appendix; and FIG. 39 of the Appendix illustrates a specification table for the heater 82 of FIG. 36 of the Appendix.

A preferred impeller 92 is disclosed with reference to FIGS. 40-44 of the Appendix. FIG. 40 of the Appendix illustrates a perspective view of a preferred impeller 92 for the circulating of air within each of the pet containers 100,200. Additionally, the impeller 92 also is known as a centrifugal fan. The impeller 92 is in contrast to and does not encompass an axial-flow fan, which has a propeller. FIG. 41 of the Appendix is a table of additional features and characteristics of the impeller 92 of FIG. 40 of the Appendix; FIG. 42 of the Appendix is a table showing operational specifications of the impeller 92 of FIG. 40 of the Appendix; FIG. 43 of the Appendix is a plan view of a front of the impeller 92 of FIG. 40 of the Appendix; and FIG. 44 of the Appendix is a plan view of a peripheral side of the impeller 92 of FIG. 40 of the Appendix.

FIGS. 45a-f45g of the Appendix illustrate an alternative preferred bed. Specifically, FIG. 45a of the Appendix illustrates a perspective view of a bed 328; FIG. 45b of the Appendix illustrates a top plan view of the bed 328; FIG. 45c of the Appendix illustrates a bottom plan view of the bed 328; FIG. 45d of the Appendix illustrates a right side elevational view of the bed 328; FIG. 45e of the Appendix illustrates a left side elevational view of the bed 328; FIG. 45f of the Appendix illustrates a front elevational view of the bed 328; and FIG. 45g of the Appendix illustrates a rear elevational view of the bed 328. FIG. 45h of the Appendix illustrates a method of unzipping a covering 330 of the bed 328 and removing a foam core 332 of the bed 328.

FIG. 46a-46d of the Appendix schematically illustrate the construction of a preferred covering 334 of a bed.

FIG. 47 of the Appendix illustrates components of another preferred pet container in accordance with one or more aspects and features of the invention. The illustrated components include a housing 418; a panel 412; lengthwise supports 408,410; door frame 419; and door 420. Except for the illustrated panel 412, these components define ducts through which airflow passes as a result of the impeller of the housing. FIG. 47a of the Appendix is a view of the components of FIG. 47 of the Appendix wherein the internal ducts defined by these components are illustrated in dashed lines. It will be appreciated that panel 412 as illustrated is neither transparent nor translucent.

FIG. 48 of the Appendix is a schematic view of components of another preferred pet container in accordance with one or more aspects and features of the invention, and FIG. 49 of the Appendix is another view of the components of FIG. 48 of the Appendix. It will be appreciated that, as illustrated in FIGS. 48 and 49 of the Appendix, a housing 518 is integrally formed to include two bottom, lengthwise support portions and a door frame portion, with a door 520 being connected to the door frame portion of the housing by four L-shaped brackets 552,554,556,558. The door is seen in a closed position in FIG. 48 of the Appendix and in an open position in FIG. 49 of the Appendix.

While not illustrated, a pet container in accordance with one or more aspects and features of the invention also preferably comprises one or more temperature sensors. Specifically, temperature sensors preferably are placed at multiple locations for measuring or sensing temperature and, specifically, measuring the temperature of the airflow following each heater that is included as well as at each air intake port. A temperature sensor integrated on an exterior of the housing also is contemplated for providing a static ambient temperature.

Additionally, while not illustrated, a pet container in accordance with one or more aspects and features of the invention also preferably comprises red light and near infrared light therapy (photobiomodulation). In particular, a light, laser, or array of LEDs is incorporated into the housing that emits a light into the containment space have a wavelength of between about 620 nanometers and about 1000 nanometers, and preferably 800 nanometers and about 1000 nanometers.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention. Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A pet container, comprising:
   (a) a housing comprising an impeller and a heater for creating a heated airflow, and one or more housing enclosed air passageways in fluid communication with the impeller and the heater for conducting airflow within the housing;
   (b) electronics for operating the impeller and the heater;
   (c) a door frame comprising one or more door frame enclosed air passageways for conducting the airflow within the door frame;
   (d) a door attached to the door frame and transitionable between a closed position and an open position for ingress and egress of a pet;
   (e) a base extending between and interconnecting the housing and the door frame, the base comprising one or more base enclosed air passageways for conducting the airflow within the base, wherein the one or more base enclosed air passageways are in fluid communication with the one or more housing enclosed air passageways and the one or more door frame enclosed air passageways; and
   (f) a plurality of panels extending between and interconnecting the housing and the door frame;
   (g) wherein the pet container defines a pet containment space, with the base defining a floor of the pet containment space, the housing defining a first end of the pet containment space, the door frame and the door defining a second, opposite end of the pet containment space, and the panels defining first and second opposite sides and a top of the pet containment space;
   (h) wherein the housing comprises vents opening into the housing enclosed air passageways for directing the airflow within the housing into the containment space in a direction away from the first end of the containment space, the door frame comprises vents opening into the door frame enclosed air passageways for directing the airflow within the door frame into the containment space in a direction away from the second end of the containment space, and the base comprises vents opening into the base enclosed air passageways for directing the airflow within the base into the containment space in a direction from the floor toward the top of the containment space; and
   (i) wherein the base attaches to the housing through a press-fit or snap-fit connection, and the base attaches to the door frame through a press-fit or snap-fit connection.

2. The pet container of claim 1, wherein the base comprises a floor extending between the housing and the door frame.

3. The pet container of claim 1, further comprising a bed extending between the housing and the door frame, the bed comprising a non-foldable mat having an outer water-resistant or waterproof covering which covering encloses a foam core that provides cushioning.

4. The pet container of claim 3, wherein the base comprises lengthwise support members within which the one or more enclosed air passageways are defined, and wherein the bed is configured to be inserted and withdrawn from the base through a gap created between one of the lengthwise support members and one of the panels.

5. The pet container of claim 3, wherein the base comprises a tray assembly extending under the bed; and wherein the tray assembly comprises an impervious tray and a porous support structure or grate located within the tray for supporting the bed.

6. The pet container of claim 5, wherein the base comprises lengthwise support members within which the one or more enclosed air passageways are defined, and wherein the tray is supported by the lengthwise support members.

7. The pet container of claim 5, wherein the tray assembly is configured to slide under a bottom of the door when inserting and withdrawing the tray assembly.

8. The pet container of claim 1, wherein the housing comprises an air intake through which air is suctioned from the pet containment space toward the impeller, and wherein the air intake is located in a bottom portion of the housing.

9. The pet container of claim 1, wherein the housing comprises an air intake through which air is suctioned from the pet containment space toward the impeller, and further comprising a filter located at the air intake.

10. The pet container of claim 1, wherein the base comprises enclosed channel supports each attached at a first end to the housing and at a second end to the door frame, the channel supports comprising the one or more enclosed air passageways for airflow from the housing to the door frame; wherein the base further comprises a tray assembly for collecting fluid, wherein each enclosed channel support receives and supports the tray assembly; and wherein the tray assembly comprises a water impervious tray having a lip, each enclosed channel support receiving thereon the lip of the tray.

11. The pet container of claim 1, wherein the base comprises enclosed channel supports each attached at a first end to the housing and at a second end to the door frame, the channel supports comprising the one or more enclosed air passageways for airflow from the housing to the door frame; and wherein the base further comprises a bed for placement over a tray assembly, the bed extending between the housing and the door frame.

12. The pet container of claim 1, wherein each of the panels attaches to the housing through a press-fit or snap-fit connection, and attaches to the door frame through a press-fit or snap-fit connection.

13. The pet container of claim 12, wherein each of the panels attaches to the housing through a press-fit or snap-fit connection, and attaches to the door frame through a press-fit or snap-fit connection; wherein the door attaches to the door frame by being received within a recess or track of the door frame, whereby the pet container is configured to be assembled without using fasteners; and wherein a pin of the door is received within a recess or track of the door frame for attaching the door to the door frame.

14. The pet container of claim 1, further comprising a scent cartridge configured for disposition within a path of the airflow for providing an aroma to the airflow.

15. The pet container of claim 1, wherein the base comprises lengthwise support members within which the one or more enclosed air passageways are defined, and wherein each of the lengthwise supports is a single piece of molded material or a single piece of extruded material.

16. A pet container, comprising:
(a) a housing comprising an impeller and a heater for creating a heated airflow, and one or more housing enclosed air passageways in fluid communication with the impeller and the heater for conducting airflow within the housing;
(b) electronics for operating the impeller and the heater;
(c) a door frame;
(d) a door attached to the door frame and transitionable between a closed position and an open position for ingress and egress of a pet;
(e) a base extending between and interconnecting the housing and the door frame, the base comprising one or more base enclosed air passageways in fluid communication with the one or more housing enclosed air passageways for conducting the airflow within the base; and
(f) a plurality of panels extending between and interconnecting the housing and the door frame;
(g) wherein the pet container defines a pet containment space, with the base defining a floor of the pet containment space, the housing defining a first end of the pet containment space, the door frame and the door defining a second, opposite end of the pet containment space, and the panels defining first and second opposite sides and a top of the pet containment space;
(h) wherein the base comprises vents opening into the base enclosed air passageways for directing the airflow within the base into the containment space in a direction from the floor toward the top of the containment space; and
(i) wherein the base attaches to the housing through a press-fit or snap-fit connection, and the base attaches to the door frame through a press-fit or snap-fit connection.

* * * * *